(12) United States Patent
Snyder, Jr. et al.

(10) Patent No.: US 8,127,668 B2
(45) Date of Patent: Mar. 6, 2012

(54) APPARATUS FOR DESTEMMING AND VEGETATIVE SHREDDING

(76) Inventors: Delmar E. Snyder, Jr., Oroville, CA (US); William Kenneth Snyder, Laytonville, CA (US)

(*) Notice: Subject to any disclaimer, the term of this patent is extended or adjusted under 35 U.S.C. 154(b) by 481 days.

(21) Appl. No.: 12/363,563

(22) Filed: Jan. 30, 2009

(65) Prior Publication Data

US 2009/0191928 A1    Jul. 30, 2009

Related U.S. Application Data

(60) Provisional application No. 61/024,860, filed on Jan. 30, 2008.

(51) Int. Cl.
*A23N 15/04* (2006.01)
*A23N 15/00* (2006.01)

(52) U.S. Cl. .......................... 99/636; 99/637

(58) Field of Classification Search ............ 99/636–640, 99/643; 460/142, 144
See application file for complete search history.

(56) References Cited

U.S. PATENT DOCUMENTS 1,358,002 A * 11/1920 Lash .............................. 99/636
(Continued)

*Primary Examiner* — Kien Nguyen
(74) *Attorney, Agent, or Firm* — Craig M. Stainbrook; Stainbrook & Stainbrook, LLP

(57) ABSTRACT

A vegetative shredder and destemming apparatus that includes a shredding drum having a interior volume into which a harvested plant crop may be placed for processing. The drum includes a substantially cylindrical side with a plurality of openings and at least one brush roller disposed proximate the cylindrical side. A motor rotates the shredding drum and the brush rollers simultaneously. The apparatus employs centrifugal force to urge portions of the plant material into engagement with the drum's cylindrical side and the openings therethrough so as to allow bring the brush rollers to mechanically shred and destem the plant material.

6 Claims, 7 Drawing Sheets

U.S. PATENT DOCUMENTS

| | | | |
|---|---|---|---|
| 2,242,113 A * | 5/1941 | Cover | 99/486 |
| 3,601,171 A * | 8/1971 | Farrow | 99/637 |
| 4,542,687 A | 9/1985 | Johnson | |
| 4,936,205 A | 6/1990 | Flora | |
| 5,203,259 A | 4/1993 | Miedema | |
| 5,846,129 A | 12/1998 | Dragt | |

* cited by examiner

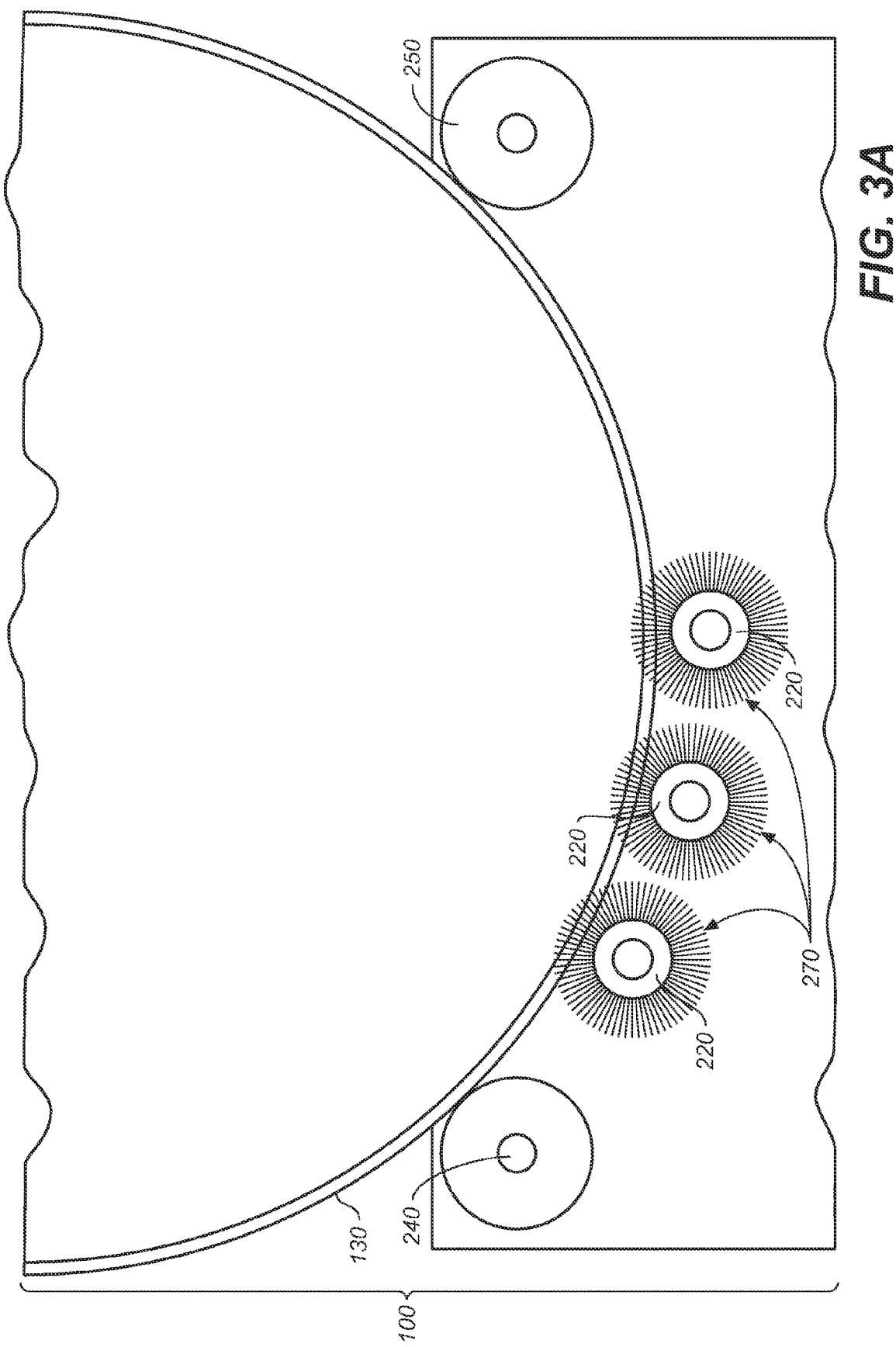

APPARATUS FOR DESTEMMING AND VEGETATIVE SHREDDING

CROSS REFERENCES TO RELATED APPLICATIONS

The present application claims the benefit of the filing date of U.S. Provisional Patent Application Ser. No. 61/024,860, filed Jan. 30, 2008.

SEQUENCE LISTING

Not applicable.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

The present invention relates to the field of crop processing equipment, and more particularly to an apparatus for destemming and removing vegetative material from a target crop.

2. Discussion of Related Art Including Information Disclosed Under 37 CFR §§1.97, 1.98

It is well known to use automated methods for removing vegetable crops such as tomatoes and peppers. The machinery typically comprises devices that shake, agitate or oscillate the produce so as to break the vegetables free from their attached vines. For instance, a typical approach utilizes an agitating conveyor having spaced openings of such a size that when the vegetables or fruit are shaken free from the vine, the valuable fruit/vegetable falls through the conveyor openings and is collected in receptacles below the conveyor. The vegetative material remains on the conveyor and is transported to a waste collection, composting, and/or disposal area.

Another method for segregating and removing vines, leaves or stems employ screw feeders that deposit material into a separating apparatus that has internal radially extending paddles, tines or brushes that rotate the material against a slotted surface. The slots are of a particular width to accept the produce of interest. The slots may be in the form of spaced rollers, may be flat wire or rodded grates or may be cylinders with apertures cut through the surface.

U.S. Pat. No. 5,846,129, to Dragt, discloses an apparatus for separating produce from a produce vine using a cylindrical shaker brush assembly having a plurality of spaced-apart tines extending radially outwardly, mounted to a frame for rotation about an axis. The brushes are vibrated during rotation creating a shaker brush assembly. The free ends of the tines are in close proximity to the conveyor assembly, creating contact between the crop and the shaker brush assembly. Exemplary patents include the following:

U.S. Pat. No. 5,203,259, to Miedema, discloses a fruit destemmer having a continuous conveyor belt made up of a plurality of counter-rotating metal rollers rotatably supported at each end by endless chains. The fruit destemmer has an inclined bed with a driven shaft at each end. Each driven shaft has a wheel at one end and a sprocket at the other with the positioning of the wheel and sprocket being reversed on the other drive shaft. The continuous chains are driven by spaced sprockets mounted on a shaft positioned below the inclined bed. A rotatably mounted shaft, having a wheel mounted on each end, presses each continuous chain into close contact with the driving sprockets. The rollers used to form the endless fruit conveying belt are made of hard anodized aluminum which has a surface pattern to reduce fruit skinning. The rollers rotate counter to each other by a pair of spaced and adjustable segmented gear racks. The number of segments in contact with the rollers can be decreased to reduce fruit damage as the fruit becomes softer.

U.S. Pat. No. 4,936,205, to Flora, teaches a machine for destemming cherries. The fruit is moved over a transport frame on an endless belt. A stem wiper blade is rotated just above the surface of the fruit. A source of rapid horizontal motion is provided for the transport frame to cause the fruit to rotate so that the stems are elevated into the path of a blade and the blade detaches the stems from the fruit.

U.S. Pat. No. 4,542,687, to Johnson, discloses an apparatus for removing stems, dirt, and debris from picked green peanuts. Green peanuts are fed into a destemmer having a slotted sloping plate through which rotating slotted destemmer wheels project. The stems are caught in the wheel slots and separated from the peanuts as the wheels rotate through the plate slots. The destemmed peanuts are deposited in a washing tank in which rotating cylindrical brushes force the peanuts under water, removing dirt and debris.

The present invention provides novel improvements to the devices disclosed in the aforementioned references. A notable improvement consists of the combined use of a cutting cylinder and brush rollers to clean vegetative matter from a target crop.

The foregoing patents reflect the current state of the art of which the present inventor is aware. Reference to, and discussion of, these patents is intended to aid in discharging Applicant's prospective duty of candor in disclosing information during examination that may be materially relevant to the allowability of claims to the present invention. However, it is respectfully submitted that none of the above-indicated patents disclose, teach, suggest, show, or otherwise render obvious, either singly or when considered in combination, the invention described herein.

BRIEF SUMMARY OF THE INVENTION

The present invention is a destemmer and a shredder of vegetative waste material associated with the destemming process.

It is therefore an object of the present invention to provide a new and improved destemming apparatus.

It is another object of the present invention to provide a new and improved destemming apparatus that also shreds the waste vegetative material.

A further object or feature of the present invention is a new and improved destemming apparatus which uses a cylindrical wire or perforated stainless steel drum to effect the destemming.

An even further object of the present invention is to provide a novel destemming apparatus which employs bristled brush rollers that grab and remove vegetative material from the shredding drum.

The apparatus for destemming and vegetative shredder (referred to as the destemmer hereafter) comprises a cabinet containing a motor which turns a plurality pulleys for running drive belts. The belts are operatively connected to drive rollers and brush rollers and provide rotational motive force for both. The brush rollers are arranged consecutively to cradle and engage the outer surface of a cylindrical shredding drum. The shredding drum has an axial dimension substantially equal to the length of the drive rollers and is placed upon the drive rollers in order to rotate about its longitudinal axis. The shredding drum tumbles any material inside, thus exposing the material to the surface of the shredding drum. The shredding drum also includes solid end caps, one or both of which has a hinged access door for accessing the interior of the shredding drum for loading and removing material to be processed in the destemmer. The surface of the shredding drum may take several forms, including a stainless steel wire basket conformation or a laser cut slotted cylinder conformation (also preferably stainless steel). The key to the conformation is the spacing and width of the aperture between wires in the wire basket or the width and spacing of the laser cut slots in the slotted conformation. In each instance, the apertures allow the vegetative material from the crop to protrude from the slots or openings in the shredding drum under the influence of centrifugal force during the rotation of the shredding drum, thus exposing the vegetative material to the brush rollers. The counter rotation of the brush rollers serves to grab the protruding vegetative material and strip it through the apertures in the shredding drum. The combined rotational movement of the shredding drum and the pulling of the brush rollers strip and cleave the vegetative material from the shredding drum. The apertures in the shredding drum are of sufficient gage to allow the vegetative material to be pulled through the aperture, while leaving the fruit, flowers, or harvest of interest to remain in the basket. The vegetative material is discarded through a chute in the body of the destemmer.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

Accordingly, before explaining the preferred embodiment of the disclosure in detail, it is to be understood that the disclosure is not limited in its application to the details of the construction and the arrangements set forth in the following description or illustrated in the drawings. The inventive apparatus described herein is capable of other embodiments and of being practiced and carried out in various ways.

Also, it is to be understood that the terminology and phraseology employed herein are for descriptive purposes only, and not limitation. Where specific dimensional and material specifications have been included or omitted from the specification or the claims, or both, it is to be understood that the same are not to be incorporated into the claims set out herein.

As such, those skilled in the art will appreciate that the conception, upon which this disclosure is based may readily be used as a basis for designing other structures, methods, and systems for carrying out the several purposes of the present invention. It is important, therefore, that the claims are regarded as including such equivalent constructions as far as they do not depart from the spirit and scope of the present invention. Rather, the fundamental aspects of the invention, along with the various features and structures that characterize the invention, are pointed out with particularity in the provisional claims annexed to and forming a part of this disclosure. For a better understanding of the present invention, its advantages and the specific objects attained by its uses, reference should be made to the accompanying drawings and descriptive matter in which there are illustrated the preferred embodiment.

BRIEF DESCRIPTION OF THE SEVERAL VIEWS OF THE DRAWINGS

The invention will be better understood and objects other than those set forth above will become apparent when consideration is given to the following detailed description thereof. Such description makes reference to the annexed drawings wherein:

FIG. 3A is an enlarged schematic cross-sectional back side view in elevation of the destemmer showing detail of the brush and roller assembly;

DRAWING REFERENCE NUMERALS FIGS. 1-5

Figure 1:
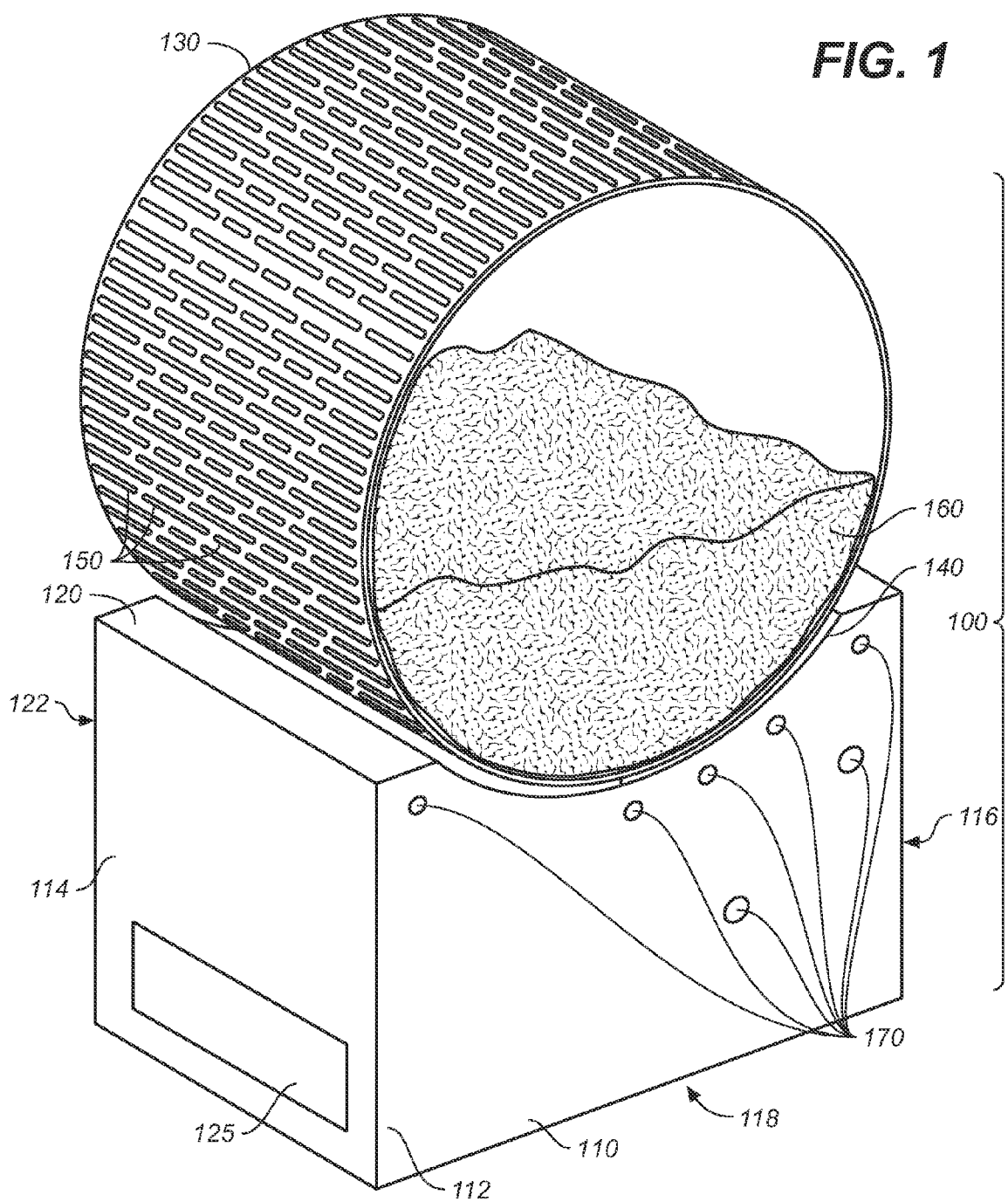
FIG. 1 is an upper front left schematic perspective view of the destemmer.

100 destemmer
110 cabinet
112 cabinet front side
114 cabinet left side
116 cabinet right side
118 cabinet bottom side (base)
120 cabinet top side
125 waste chute
130 shredding drum
135 alternative shredding drum
140 semicircular cutout
150 slots
160 crop
170 spindle/axle holes
200 end cap
210 motor
220 brush rollers
230 drive spindle
240 drive roller
250 support roller
255 drive pulley
257 drive shaft
260a primary drive belt (for drive roller)
260b primary drive belt (for brush rollers)
265 brush roller pulleys
270 bristles
275 spindle pulley
280 secondary drive belt
300 hinged hatch
400 final drive pulleys
410 tertiary drive belts
420 belt grooves

DETAILED DESCRIPTION OF THE INVENTION

Referring to FIGS. 1 through 5, wherein like reference numerals refer to like components in the various views, there is illustrated therein a new and improved apparatus for destemming and vegetative shredding referred to a destemmer hereafter), generally denominated 100 herein.

FIG. 1 illustrates a first preferred embodiment of the inventive destemmer 100. This view shows that the inventive apparatus generally comprises a cabinet 110 with a waste chute 125 and a cylindrical shredding drum 130. The cabinet is a substantially cuboid box, having a front side 112, a left side 114, a right side 116, a bottom side 118 (or base) for placement on a floor or ground, a top side 120, and a back side 122. The waste chute 125 may empty on any side of the cabinet. The top of the cabinet is open, with the tops of the left and right sides each having a semicircular or arcuate cutout 140 to accommodate the curved surface of the shredding drum 130. The shredding drum is preferably fabricated from a sheet metal, stainless steel, ideally, and having a plurality of axially oriented perforations or slots 150 formed during manufacture by a process of laser cutting. These laser cut slots 150 allow the vegetative portion of a crop 160 to protrude through the slots 150 as the drum is rolled and centrifugal force acts on the crop material to pull it outwardly from the axis of rotation. As an alternative, the slots may be circumferentially oriented, or they may comprise the opening formed in a mesh or wire screen-type cylindrical shredding drum (as shown in FIG. 4A), and the wire or mesh pattern may consist of any of a number of suitable forms, including wires disposed principally circumferentially and thereby defining the outside wall of the cylinder with a suitable number of wires running transversely (i.e., from one end of the drum to the other) and welded to the circumferentially disposed wires in a sufficiently sturdy configuration; or wires disposed principally transversely (i.e., from one end of the cylinder to the other) with a suitable number of wires running circumferentially and welded to the transversely disposed wires in a sufficiently sturdy configuration.

It will be noted that the cabinet 110 includes spindle or axle holes 170 cut into the cabinet sides and through which roller spindles or axles protrude.

Figure 2:
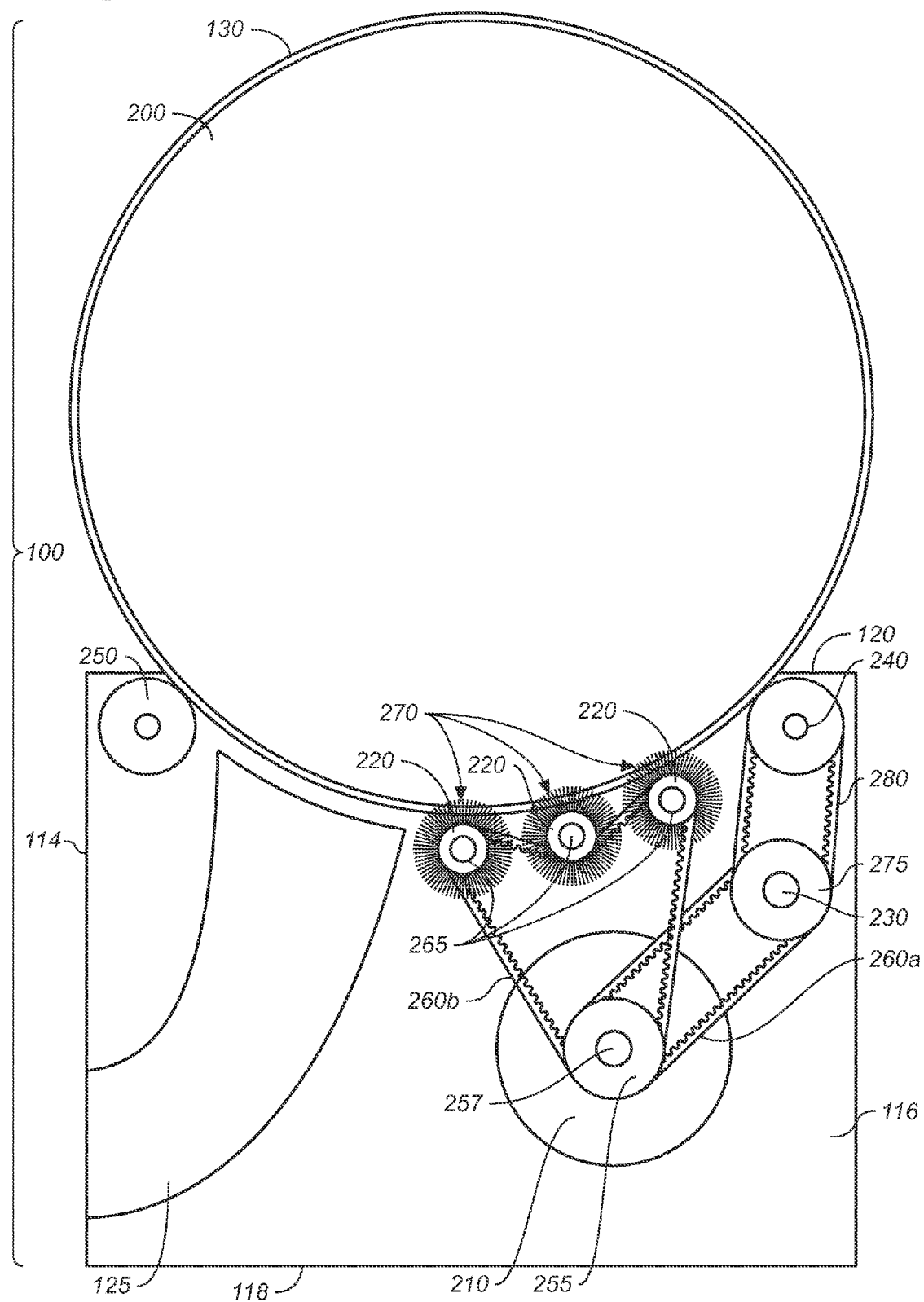
FIG. 2 is a schematic cross-sectional front side view in elevation of the destemmer.

FIG. 2 is a cross-sectional right side view in elevation of the destemmer 100. In this view, the shredding drum 130 shows a solid end cap 200 that serves to contain the crop 160 being processed within the shredding drum 130. An electric or otherwise powered motor 210 provides a rotational motive force to a plurality of brush rollers 220, a drive spindle (axle) 230, and a drive roller 240. A freely rotating support roller 250, shown disposed pictured at the front of the destemmer, acts simply as a support for the shredding drum. The motor 210 includes a drive pulley 255 mounted on a drive shaft 257, and the drive pulley is connected to the brush rollers 220 through a primary drive belt 260b. One primary drive belt interacts with the brush rollers 220 by winding through the brush roller pulleys 265. The brush roller pulleys 265 preferably have a smaller diameter than the drive pulley 255 so as to produce a faster rotation of the brush roller pulleys 265 relative to the drive pulley 255. In the preferred embodiment, the primary drive belt 260b interacts with at least three brush rollers, two outside (or outboard) and one inside, middle (or inboard) brush roller, each having a brush roller pulley 265, and the primary drive belt is wound through the brush roller pulleys 265 in an "over-under-over" pattern, causing the outside brush rollers 220 to rotate in a direction opposite the middle or interior brush roller. This fast, counter rotational action by the brush rollers 220 initiates a grabbing action by the brush rollers 220, which have bristles that extend at least partially into the slots 150 in the shredding drum 130. This grabbing action pulls vegetative material through the slots 150 and directs the separated material into the waste chute 125. A second primary drive belt 260a is connected to a spindle pulley 275, which is approximately the same diameter as the drive pulley 255, thus delivering a rotational force to the spindle 230, which in turn provides rotational force to the drive roller 240 through a secondary drive belt 280. The drive roller 240 is constructed of metal, with a rubber or other suitable coating for providing a traction surface to the shredding drum, the latter of which has an outer circumferential surface that rides upon the drive roller 240.

As used herein, "belt" means any kind of belt or chain employed to transfer power smoothly from an engine to a pulley. It is intended to encompass belts that are flat, vee shapped, round, reinforced, non-reinforced, toothed, notch, or cog, or any suitable combination thereof, and it is further intended to include the operationally equivalent kinds of chain. Accordingly, as used herein, the term "pulley" be understood to encompass apparatus suitable for use with complementary power transfer apparatus, such as the belts and chain described above. Thus, it will be understood to mean a toothed gear, a splined wheel or pulley, a smooth grooved pulley, and so forth.

Spindle pulley 275 may be removed, and the brush rollers and drive rollers independently actuated by separate motors. Further, both rollers may be provided with reversible operation so that the brushing action relative to the rolling action of the drum can be altered and tailored to optimize the destemming and shredding action. Thus, in a second preferred embodiment, two motors are provided: a first gear motor rotating at 60 rpm and driving the drive roller, and a second brush motor rotating at 3500 rpm and driving the brush rollers. The purpose of the segregated operation is to permit operation of the drive rollers and rotation of the drum even after the brush motor is shut off. Accordingly, the rotating drum will continue to aerate product and thereby prevents the product from settling in piles that can heat up and cause mold.

Figure 3:
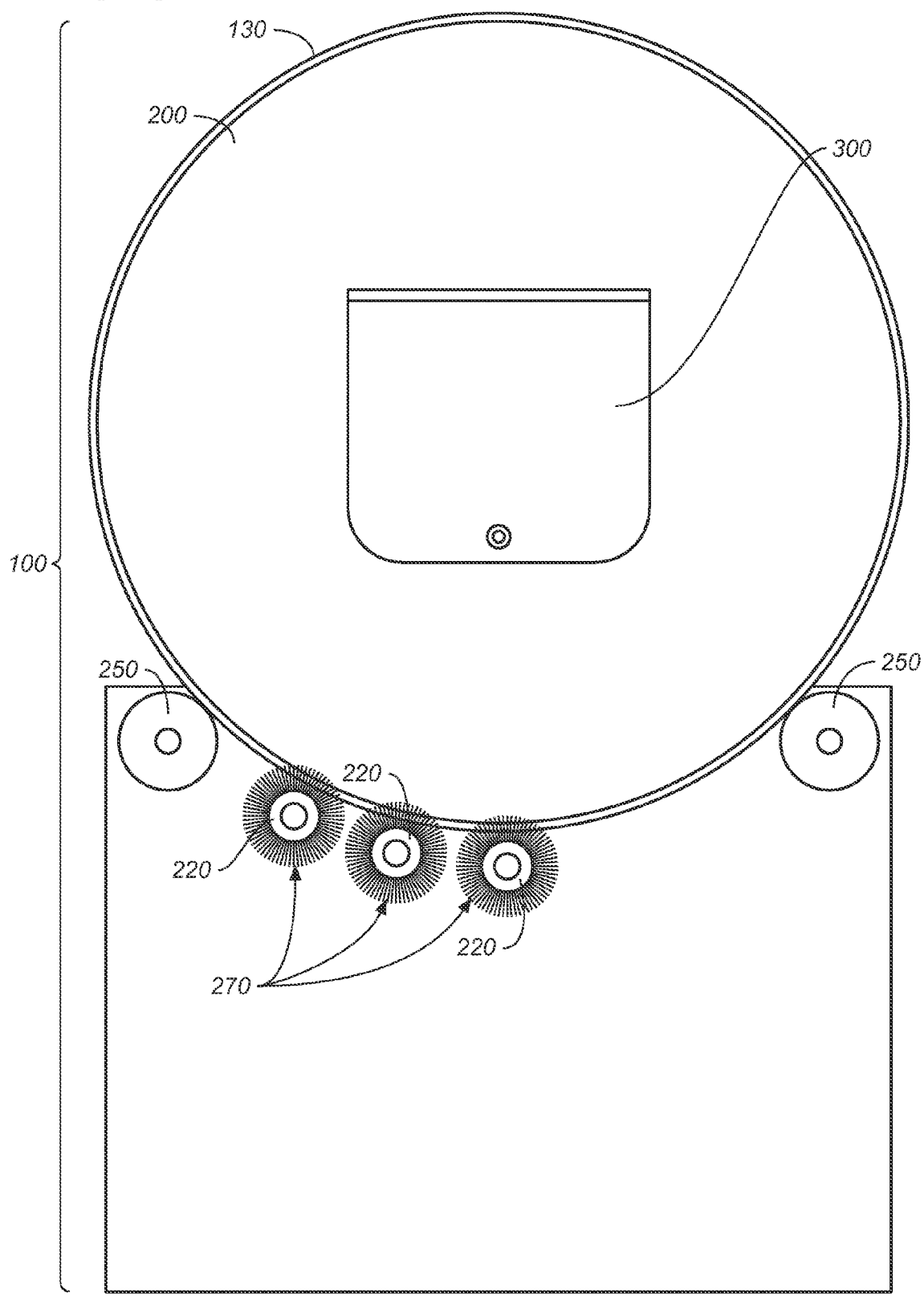
FIG. 3 is a schematic cross-sectional back or rear side view in elevation of the destemmer.

FIGS. 3 and 3A provide a left side view of the destemmer 100 showing the orientation of the shredding drum 130 in relation to the drive roller 240, the brush rollers 220 and the support roller 250. The bristles 270 of the brush rollers 220 protrude through the slots 150 (FIG.1) in the shredding drum 130. A hinged access door 300 is disposed in the end cap 200 to provide access to the interior of the shredding drum 130.

Figure 4:
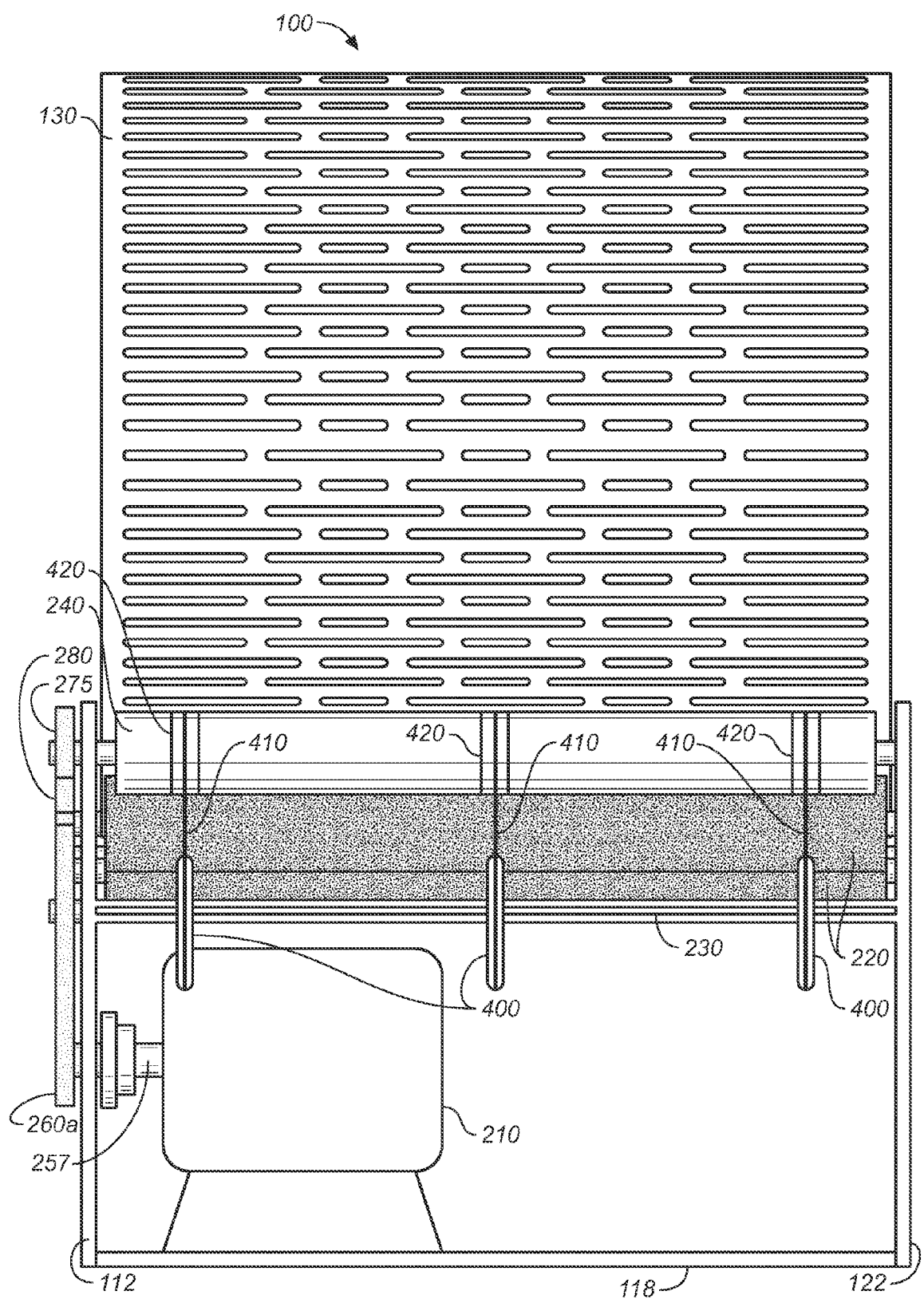
FIG. 4 is a right side view in elevation of the destemmer with the right side panel removed for viewing the internal space within the destemmer cabinet.
Figure 4A:
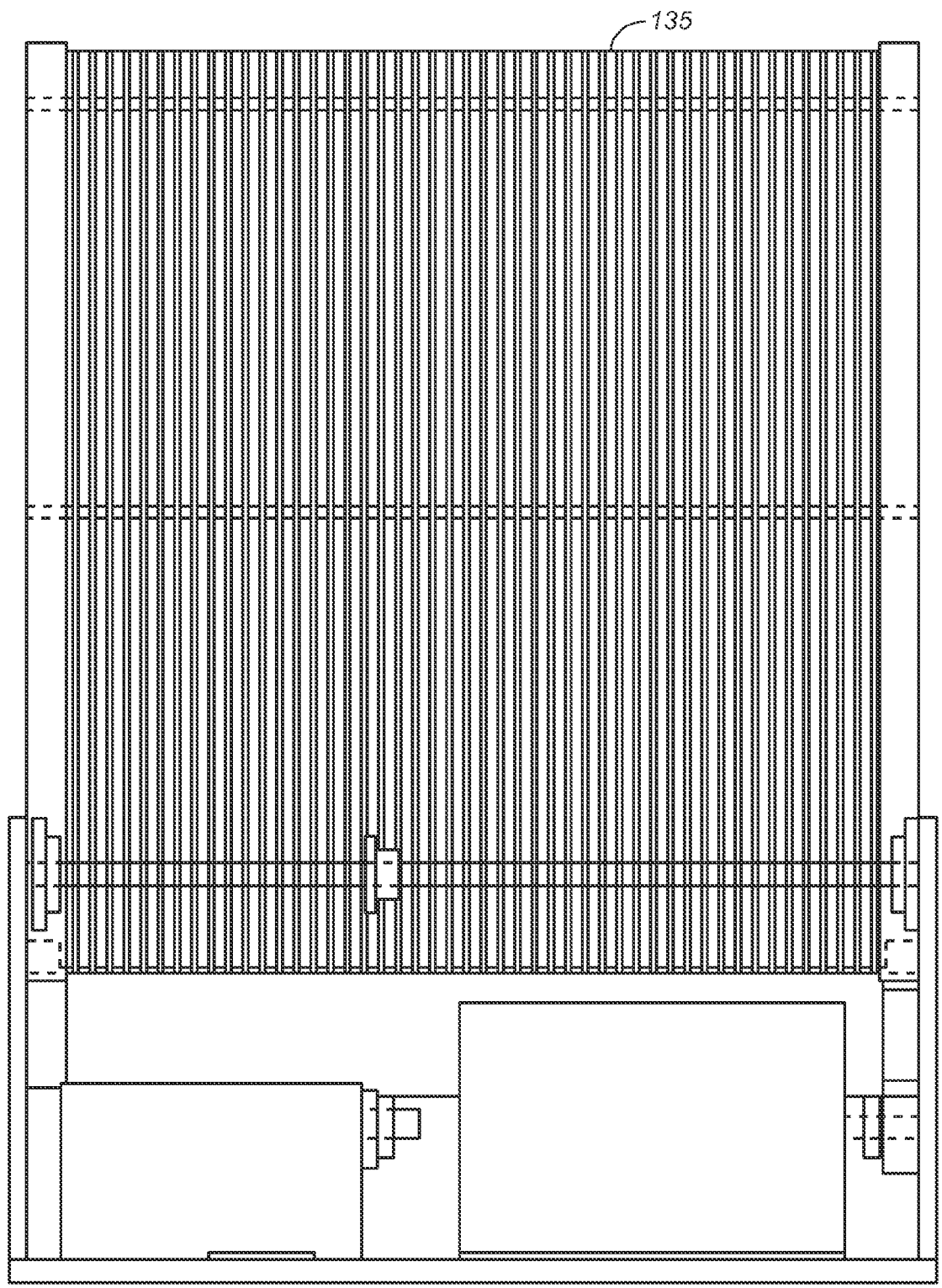
FIG. 4A is right side view in elevation showing an alternative shredding drum design.

FIG. 4 is partial cross-sectional rear view of the destemmer 100, with a cut away of the cabinet 110 exposing the motor 210, the brush rollers 220, the drive roller 240, and the spindle 230. Mounted upon the spindle 230 are final drive pulleys 400 evenly spaced along the length of the spindle 230, which employ tertiary drive belts 410 engaged on the final drive pulleys 400 and operatively connected to the drive roller 240 via belt grooves 420. The belt grooves 420 align with the final drive pulleys 400 to provide the rotational force to the drive roller 240, and thereby transferring rotational force to the shredding drum 130.

FIG. 4A shows an alternative shredding drum 135 employed on the cabinet and motor drive unit. The drum is essentially a cylindrical wire basket comprising a plurality of circumferentially disposed circular wires or rods connected by a plurality of spaced apart transverse rods welded to the circumferential rods, in a manner well known in the art. This construction maximizes the available openings for presenting plant material to the brush rollers and provides rounded edges that reduce wear and tear on the roller bristles.

Figure 5:
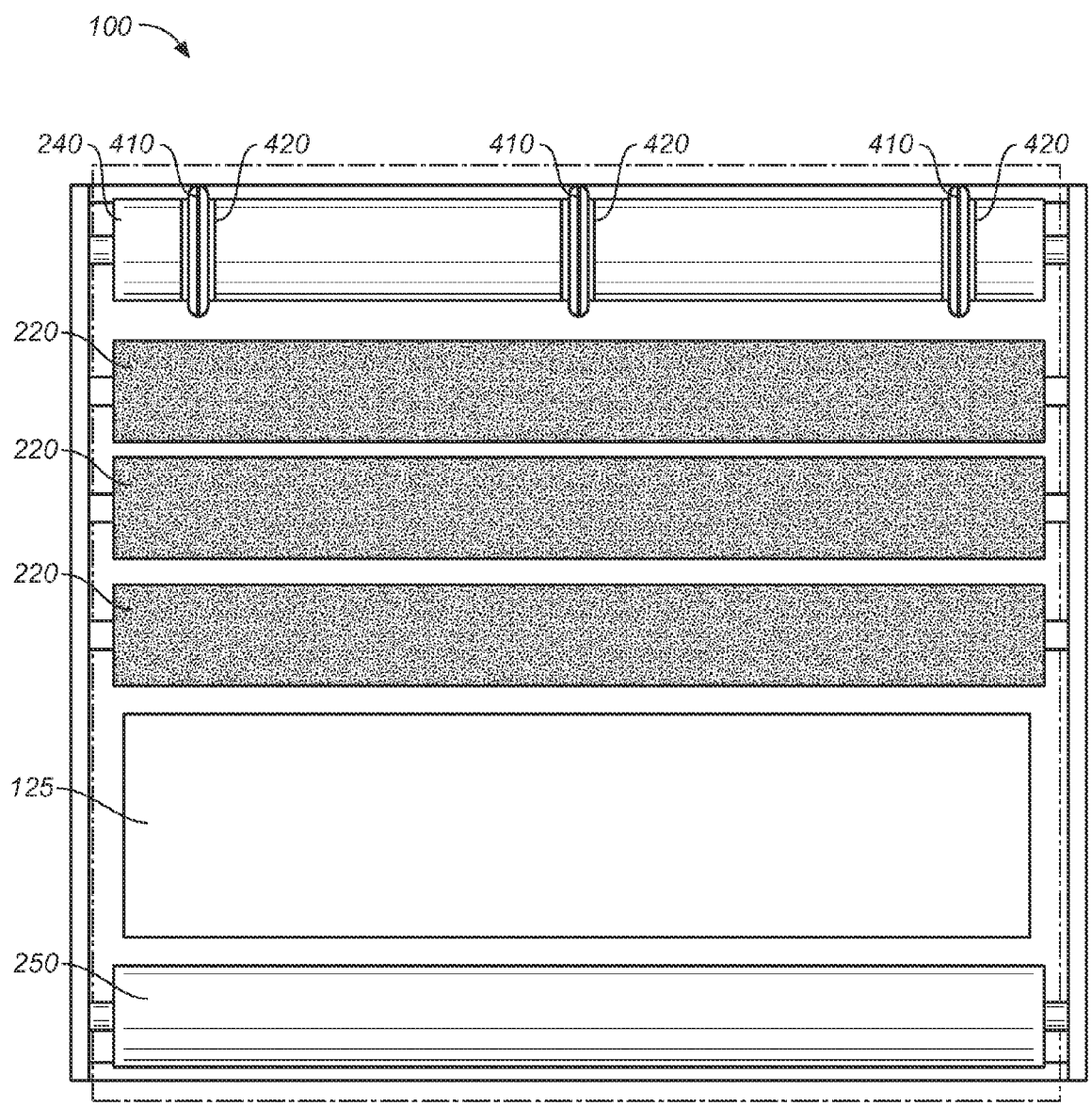
FIG. 5 is a top plan view of the destemmer with the shredding drum removed and showing the cabinet interior and contents therein.

FIG. 5 is a top plan view of the destemmer 100 showing the parallel orientation of the drive roller 240, brush rollers 220 and support roller 250 in the cabinet 110. Also pictured is the waste chute 125. Tertiary drive belts 410 are pictured in the belt grooves 420 on the drive roller 240.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like. It will be appreciated, for instance, that the entire inventive apparatus could be mounted on casters or rollers and thus made fully transportable.

It will be further appreciated that the inventive apparatus need not be powered by a plurality of motor driven rollers disposed atop a cabinet of the kind described in the preferred embodiment. As an alternative, the shredding drum may be constructed around a central axle journaled in bearings supported in vertical supports. In such a configuration the axle is operatively connected to the motor through belts or may actually be an extension of the motor drive shaft itself. The brush rollers may be disposed at the sides of the shredding drum and driven by gears or belts operative connected to the drum axle. Accordingly, it will be appreciated that the essence of the invention is the combination of the inventive motorized shredding drum and motorized brush rollers configured to share a single power source and utilizing centrifugal force to expose plant material for mechanical shredding and destemming.

Therefore, the above description and illustrations should not be construed as limiting the scope of the invention, which shall be defined by claims when and as filed.

The invention claimed is:

1. A destemmer and vegetative shredder, comprising:
   a hollow shredding drum having a substantially cylindrical side with a plurality of openings;
   at least one brush roller disposed proximate said cylindrical side;
   a motor operatively connected to said shredding drum and said at least one brush roller so as to turn both simultaneously;
   whereby said apparatus employs centrifugal force to urge portions of a crop of plant material into engagement with said cylindrical side and the openings therethrough so as to allow said brush rollers to mechanically shred and destem the plant material;
   wherein said motor includes a drive shaft having a drive pulley, and said at least one brush roller includes a brush roller pulley connected to said drive pulley with a brush roller drive belt and having a smaller diameter than said drive pulley so as to produce a faster rotation of said brush roller pulley relative to said drive pulley; and
   at least two brush rollers, each having a brush roller pulley, and wherein said belt brush roller drive belt is wound through said brush roller pulleys in an over-under pattern, thereby causing said brush rollers to rotate in opposite directions.

2. The apparatus of claim 1, including at least three brush rollers, including two outside brush rollers and at least one interior brush roller, each of said brush rollers having a brush roller pulley, and wherein said brush roller drive belt is wound through said brush roller pulleys in an over-under-over pattern, thereby causing at least two of said outside brush rollers to rotate in a direction opposite that of said at least one interior brush roller.

3. The destemmer and vegetative shredder of claim 1, wherein said shredding drum is fabricated from a sheet metal and includes having a plurality of elongate slots.

4. The destemmer and vegetative shredder of claim 3, wherein the slots in said shredding drum are axially oriented.

5. The destemmer and vegetative shredder of claim 3, where the slots in said shredding drum are circumferentially oriented.

6. The destemmer and vegetative shredder of claim 1, wherein said shredding drum is a wire basket.

* * * * *